(12) United States Patent
Shima

(10) Patent No.: US 7,702,841 B2
(45) Date of Patent: Apr. 20, 2010

(54) SEMICONDUCTOR INTEGRATED CIRCUIT AND IMAGE PROCESSING APPARATUS HAVING THE SAME

(75) Inventor: Tomohiro Shima, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 85 days.

(21) Appl. No.: 12/073,399

(22) Filed: Mar. 5, 2008

(65) Prior Publication Data

US 2008/0222330 A1 Sep. 11, 2008

(30) Foreign Application Priority Data

Mar. 8, 2007 (JP) ............................. 2007-058209
Dec. 27, 2007 (JP) ............................. 2007-336434

(51) Int. Cl.
*G06F 7/78* (2006.01)
(52) U.S. Cl. ..................... 710/310; 710/52; 711/169
(58) Field of Classification Search ................. 711/169; 710/310, 52
See application file for complete search history.

(56) References Cited

U.S. PATENT DOCUMENTS

| 3,876,978 | A | * | 4/1975 | Bossen et al. ............... 714/805 |
| 4,630,230 | A | * | 12/1986 | Sundet ......................... 711/169 |
| 4,954,946 | A | * | 9/1990 | Natusch et al. .............. 711/169 |
| 5,179,679 | A | * | 1/1993 | Shoemaker .................. 711/118 |
| 5,379,379 | A | * | 1/1995 | Becker et al. ................... 711/3 |
| 5,404,480 | A | * | 4/1995 | Suzuki ......................... 711/117 |
| 5,440,717 | A | * | 8/1995 | Bosshart ...................... 711/159 |
| 5,987,578 | A | * | 11/1999 | Butcher ....................... 711/169 |
| 6,088,772 | A | * | 7/2000 | Harriman et al. ............. 711/158 |
| 6,292,807 | B1 | * | 9/2001 | Larson ........................ 707/201 |
| 7,246,191 | B2 | * | 7/2007 | Stanton ....................... 710/310 |
| 7,353,310 | B2 | * | 4/2008 | Roever ........................ 710/243 |
| 7,447,805 | B2 | * | 11/2008 | Braun et al. .................... 710/5 |

FOREIGN PATENT DOCUMENTS

| JP | 2003-263363 | 9/2003 |
| JP | 2006-154910 | 6/2006 |

* cited by examiner

*Primary Examiner*—Paul R Myers
(74) *Attorney, Agent, or Firm*—Harness, Dickey & Pierce, P.L.C.

(57) ABSTRACT

An ASIC includes a receiving unit, a transmission interface, a reception interface, a buffer, and a control unit. When the receiving unit receives a second write request while the transmission interface is in process of transmitting to a transmission line a first write request and write data, the control unit causes the receiving unit to store the second write request in the buffer. When the receiving unit receives a read request while the second write request is present in the buffer, the control unit causes the receiving unit to send the read request to the transmission interface prior to the second write request.

15 Claims, 11 Drawing Sheets

SEMICONDUCTOR INTEGRATED CIRCUIT AND IMAGE PROCESSING APPARATUS HAVING THE SAME

CROSS-REFERENCE TO RELATED APPLICATIONS

The present application claims priority to and incorporates by reference the entire contents of Japanese priority documents 2007-058209 filed in Japan on Mar. 8, 2007 and 2007-336434 filed in Japan on Dec. 27, 2007.

BACKGROUND OF THE INVENTION

1. Field of the Invention

The present invention relates to a semiconductor integrated circuit and an image processing apparatus having the same.

2. Description of the Related Art

According to a conventional technology for data transmission, a plurality of devices can be connected to a peripheral component interconnect (PCI) bus. One of the devices obtains a right to use the PCI bus, and such a device is determined as a master. The master device can transmit and receive data to and from any of the other devices.

Because the PCI bus employs a parallel transmission system, when the PCI bus receives a large amount of data, it is likely to cause a bottleneck. In order to overcome such a problem of the PCI bus, a technology called PCI Express (PCIe) has been proposed.

The PCIe allows point-to-point links between devices, and employs a serial transmission system.

The PCIe employs a full-duplex system in which transmission and reception of data are performed separately, and thereby the PCIe supports split transaction. Thus, the transmission and the reception of data can be performed at the same time. In the split transaction, a request and a response to the request are separately performed, and therefore a subsequent request can be issued before the response is obtained. In this manner, the transmission and the reception of data can be performed in an effective manner and at a high speed.

In the PCIe, a latency time of a read request to read data from a memory becomes longer. The latency time is a period starting from issuing the read request and ending at receiving the data from the memory. For this reason, a timing of issuing a read request affects the throughput efficiency of a bus in use for split transaction.

FIG. 10 is a schematic diagram for explaining transmission efficiency of a conventional PCIe. When write requests are continuously received from an arbiter in an application specific integrated circuit (ASIC) or the like, the write requests are first issued, and afterwards a read request is issued. Therefore, a reception line is in an idle state during a period T1, during which write requests and data corresponding to the write requests are sent via a transmission line. As a result, the conventional PCIe obtains low transmission efficiency.

FIG. 11 is a schematic diagram for explaining another example of transmission efficiency of a conventional PCIe. If the data transmission rate in an ASIC 5 is lower than the packet transmission speed of a PCIe 6, a request is sent to the PCIe after all of data corresponding to the request is stored in a data buffer that is arranged in a PCIe interface (I/F) circuit. Thus, it is possible to prevent data underflow. However, because a request cannot be sent to the PCIe before all the data is stored in the data buffer, the transmission line is in an idle state during a period T2. Occurrence of the period T2 causes the period T1 in the reception line to increase, and therefore the transmission efficiency becomes much lower.

The use of the PCIe makes it possible to perform the transmission and the reception of data separately and at the same time, nevertheless read data transmission can still be delayed.

A master (bus master device) often executes some operation on data that is read from a memory, and then writes the resultant data in the memory. Therefore, a delay in time for receiving read data from the memory causes a delay in an issue of a write request by the master. As a result, the throughput of the whole system is lowered.

According to a conventional technology disclosed in Japanese Patent Application Laid-Open No. 2006-154910, a memory controller selects a memory access request that allows continuous access to a memory upon sending a write request and a read request, and such continuous access achieves high-speed access to the memory. Furthermore, a plurality of read accesses is collectively processed as continuous read access, and a plurality of write accesses as continuous write access. A read cycle and a write cycle are alternately processed. Thus, it is possible to reduce the number of times of switching between a read access and a write access, and achieve high-speed access to the memory.

However, such a conventional technology has a problem if employed in the PCIe. Specifically, when write requests are collectively issued via a transmission line, a reception line is in an idle state. On the other hand, when read requests are collectively issued, a transmission line is in an idle state. As a result, utilization efficiencies of the transmission line and the reception line are decreased, and the throughput of the whole system is lowered.

SUMMARY OF THE INVENTION

It is an object of the present invention to at least partially solve the problems in the conventional technology.

According to an aspect of the present invention, there is provided a semiconductor integrated circuit that is configured to be connected to a memory via a transmission line and a reception line that support a split transaction. The semiconductor integrated circuit includes a receiving unit that receives a write command to write data in the memory, write data to be written in the memory, and a read command to read data from the memory; a transmission interface that receives the write command, the write data, and the read command from the receiving unit, and sends the write command, the write data, and the read command to the transmission line; a reception interface that receives read data that is read from the memory via the reception line, and sends the read data to the receiving unit; a buffer that is configured to temporarily store therein at least one write command that is received by the receiving unit; and a control unit that. When the receiving unit receives a second write command while the transmission interface is in process of transmitting to the transmission line at least one of a first write command and write data corresponding to the first write command, the control unit causes the receiving unit to store the second write command in the buffer. When the receiving unit receives a read command while the second write command is present in the buffer, the control unit causes the receiving unit to send the read command to the transmission interface prior to the second write command present in the buffer to the transmission interface.

According to another aspect of the present invention, there is provided an image processing apparatus. The image processing apparatus includes a memory that is configured to store therein image data; and the above-described semiconductor integrated circuit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
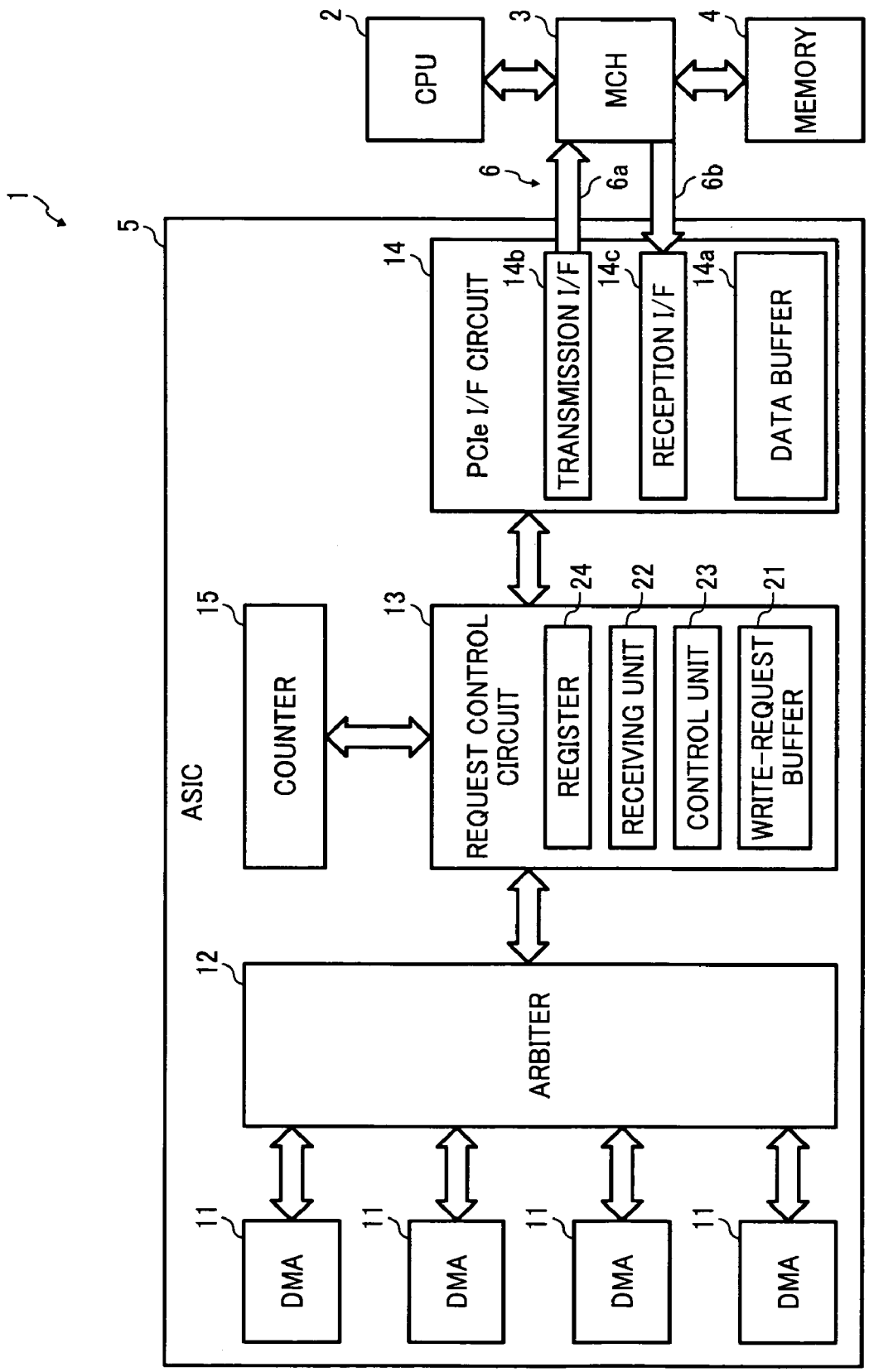
FIG. 1 is a block diagram of a relevant part of an image forming apparatus according to a first embodiment of the present invention.

FIG. 1 is a block diagram of a relevant part of an image forming apparatus 1 according to a first embodiment of the present invention.

The image forming apparatus 1 is, for example, a printer or a multifunction product. The image forming apparatus 1 includes a central processing unit (CPU) 2, a memory controller hub (MCH) 3, a memory 4, and an application specific integrated circuit (ASIC) 5 that is a semiconductor integrated circuit. The ASIC 5 is connected to the MCH 3 via a PCI Express (PCIe) 6 that is a transmission line for the split transaction.

The PCIe 6 includes a transmission (Tx) line 6a through which the ASIC 5 transmits a request or data to the MCH 3, and a reception (Rx) line 6b through which the ASIC 5 receives data from the MCH 3.

The ASIC 5 includes a plurality of (four in FIG. 1) direct memory accesses (DMAs) 11 serving as a master, an arbiter 12, a request control circuit 13, a PCIe I/F circuit 14, and a counter 15.

The DMAs 11 are connected to various devices (not shown) that are arranged inside or outside the image forming apparatus 1. Such a device includes a scanner, a plotter, and a communication I/F for transmitting and receiving image data. Specifically, data sent from the DMA 11 includes image data read by a scanner.

The arbiter 12 receives a request and data from the DMAs 11 and sends the received request and data to the request control circuit 13. The arbiter 12 also receives data from the request control circuit 13 and sends the received data to the DMAs 11.

In a conventional technology, when image data read by a scanner is to be written in a memory, a plurality of write requests and data to be written are transmitted to the memory via the PCIe, and therefore a transmission line is occupied by the write requests and the data. As a result, when a read request is issued, the read request cannot be transmitted to an MCH via the transmission line until the transmission of the write requests and the data are completed.

When the arbiter 12 receives a plurality of requests from the DMAs 11 at the same time, the arbiter 12 performs arbitration in such a manner that the received requests are sent to the request control circuit 13 one by one. The arbiter 12 causes the request with a higher priority to be first sent to the request control circuit 13.

For this operation, a write request has a higher priority than a read request. This is because data to be written in a memory in response to a write request needs to be processed as isochronous data. Therefore, a transmission line can be easily occupied with a plurality of write requests and data to be written in response to the write requests. Furthermore, in a generally used image forming apparatus, afterimage data obtained by a scanner is written in a memory, various processes are often performed on the image data. Therefore, it is considered that processing time can be reduced if a write request is processed with a higher priority than a read request.

For this reason, when the image forming apparatus 1 processes image data read by a scanner, a read request is transmitted to the MCH 3 after a write request and data to be written are transmitted to the MCH 3. This causes an increase in time for the DMA 11 to receive read data that is read from the memory in response to the read request.

Usually, a device connected to the DMA 11 receives data read from the memory 4, performs some process on the received data, and then writes the resultant data in the memory 4. Therefore, a period until the DMA 11 receives read data increases, and an issue of a write request from the device is delayed. As a result, the throughput of the whole image forming apparatus 1 can be lowered.

Because the arbiter 12 cannot detect a state of the transmission line 6a, it is difficult for the arbiter 12 to perform arbitration between a write request and a read request to shorten an idle period of the transmission line 6a. Specifically, when the arbiter 12 receives a write request and a read request at the same time, the arbiter 12 can process the write request with a higher priority than the read request. However, if the arbiter 12 processes a write request and a read request in such a manner, an idle period occurs in the reception line 6b. Therefore, the image forming apparatus 1 has the following configuration to perform arbitration between a write request and a read request.

The PCIe I/F circuit 14 includes a data buffer 14a, a transmission I/F 14b, and a reception I/F 14c.

The transmission I/F 14b receives a write request to write data in the memory 4, data to be written in the memory 4, and a read request to read data from the memory 4 that are issued from the DMA 11. The transmission I/F 14b then sends the write request, the data, and the read request to the transmission line 6a.

Figure 7:
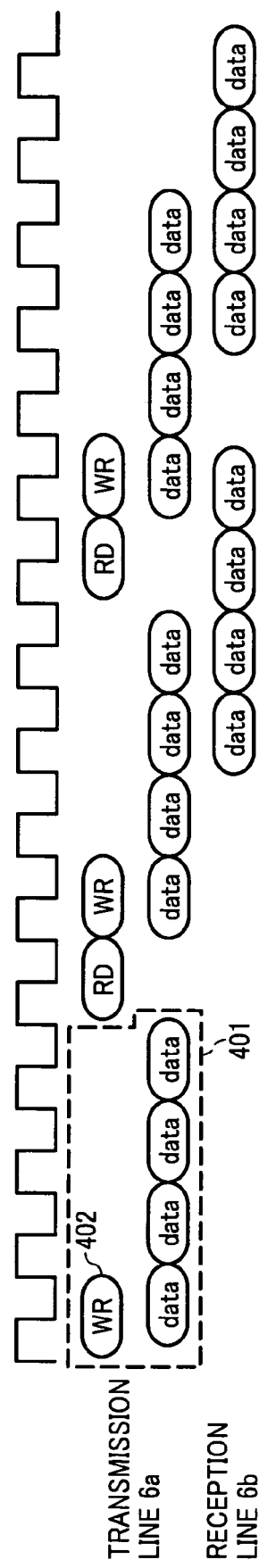
FIG. 7 is a schematic diagram for explaining transmission efficiency according to the first embodiment.

The write request and the data are stored in one packet. Specifically, the write request is stored as a packet header, and the data is stored as a packet payload. FIG. 7 is a schematic diagram for explaining transmission efficiency according to the first embodiment. A data group 401 constitutes one packet. The image forming apparatus 1 employs the split transaction as its protocol.

The reception I/F 14c receives data that is read from the memory 4 in response to a read request via the reception line 6b.

Although the counter 15 is arranged outside the request control circuit 13, the counter 15 can be arranged inside the request control circuit 13.

In the ASIC 5, the arbiter 12 receives a write request and a read request from the DMA 11 serving as a master, and performs arbitration between the write request and the read request. The arbiter 12 then sends the write request and the read request to the request control circuit 13. The request control circuit 13 then causes the write request and the read request to be sent to the PCIe I/F circuit 14. The PCIe I/F circuit 14 transmits the write request and the read request to the MCH 3 via the PCIe 6. The CPU 2 then allows access to the memory 4 that is connected to the MCH 3.

The request control circuit 13 includes a write-request buffer 21, a receiving unit 22, a control unit 23, and a register 24.

The receiving unit 22 receives, from the arbiter 12, a write request to write data in the memory 4, data to be written in the memory 4, and a read request to read data from the memory 4.

The control unit 23 controls transmission of a request and data that are received by the receiving unit 22 from the arbiter 12. The control unit 23 also controls transmission of data received by the receiving unit 22 from the PCIe I/F circuit 14.

When the receiving unit 22 receives a subsequent write request from the arbiter 12 while the transmission I/F 14b is in process of transmitting at least one of a write request and data to be written to the MCH 3 via the transmission line 6a, the control unit 23 causes the subsequent write request to be stored in the write-request buffer 21. When the receiving unit 22 receives a read request while the write request is stored in the write-request buffer 21, the control unit 23 causes the read request to be sent to the transmission I/F 14b prior to the write request present in the write-request buffer 21.

As described above, when the receiving unit 22 receives a subsequent write request from the arbiter 12 while the PCIe I/F circuit 14 is busy by transmitting a write request (a write request or data that is stored in a packet with the write request), and cannot receive a command, the control unit 23 causes the subsequent write request to be stored in the write-request buffer 21.

When the receiving unit 22 receives a request from the arbiter 12 while the PCIe I/F circuit 14 is in a busy state, i.e., is not in a position to receive a command, the request control circuit 13 does not receive a request from the arbiter 12 and causes the arbiter 12 to stand by with a control signal transmitted between the arbiter 12 and the request control circuit 13.

If no write request is stored in the write-request buffer 21 when the PCIe I/F circuit 14 resumes receiving a request, the control unit 23 causes a request received by the receiving unit 22 to be sent directly to the PCIe I/F circuit 14.

On the other hand, if a write request is stored in the write-request buffer 21 when the PCIe I/F circuit 14 resumes receiving a request, and if a subsequent request received by the receiving unit 22 is a write request, the control unit 23 causes the write request stored in the write-request buffer 21 to be sent to the PCIe I/F circuit 14, and causes the subsequent write request to be stored in the write-request buffer 21. If a subsequent request received by the receiving unit 22 is a read request, the control unit 23 causes the read request to overtake the write request present in the write-request buffer 21, i.e., the control unit 23 causes the read request to be sent to the transmission I/F 14b prior to the write request in the write-request buffer 21.

The CPU 2 causes the register 24 to set an allowable overtake number indicative of the allowable number of subsequent read requests that are to overtake a proceeding write command while the write command is present in the write-request buffer 21. The counter 15 counts the current overtake number indicative of the number of subsequent read requests that overtake a proceeding write request while the proceeding write request is present in the write-request buffer 21.

The control unit 23 causes subsequent read requests to overtake a write request stored in the write-request buffer 21 until the current overtake number counted by the counter 15 exceed the allowable overtake number. When the current overtake number exceeds the allowable overtake number, the control unit 23 inhibits overtaking of the write request stored in the write-request buffer 21 by a subsequent read request, and sends the write request prior to the subsequent read request.

Figure 2:
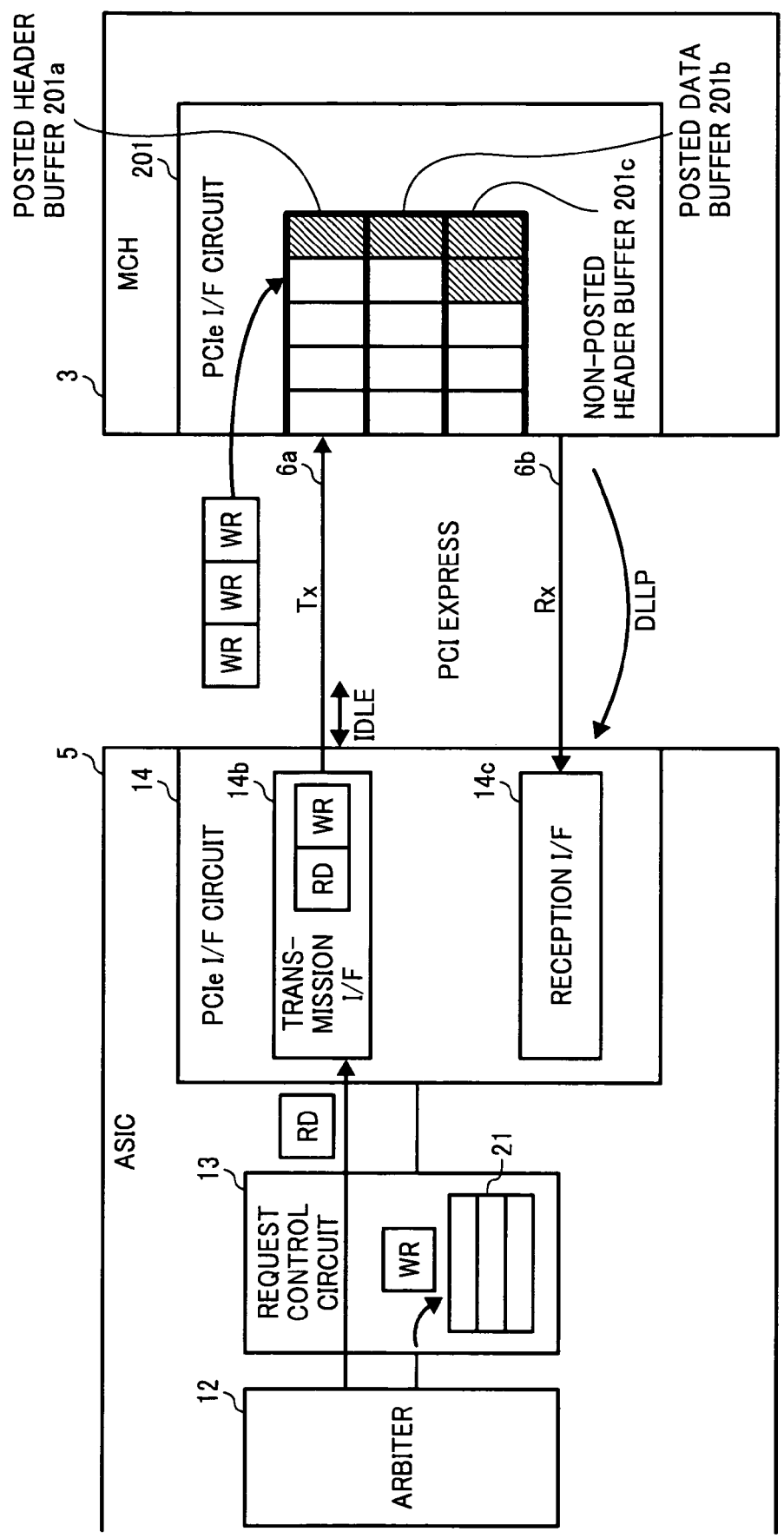
FIG. 2 is a schematic diagram for explaining operation of transmitting packets between an ASIC and an MCH shown in FIG. 1.

FIG. 2 is a schematic diagram for explaining operation of transmitting packets between the ASIC 5 and the MCH 3. The MCH 3 includes a PCIe I/F circuit 201. The PCIe I/F circuit 201 includes a posted header buffer 201a, a posted data buffer 201b, and a non-posted header buffer 201c. Because other buffer (not shown) included in the PCIe I/F circuit 201 is not used in the first embodiment, a detailed description of the other buffer is omitted. The posted header buffer 201a, the posted data buffer 201b, and the non-posted header buffer 201c are flow-control buffers that are defined by the PCIe specification.

The posted header buffer 201a stores therein a write request to write data in the memory 4.

The posted data buffer 201b stores therein data to be written in the memory 4.

The non-posted header buffer 201c stores therein a read request to read data from the memory 4.

The currently proposed PCIe employs a flow control system. Specifically, when the posted header buffer 201a, the posted data buffer 201b, and the non-posted header buffer 201c cannot receive a packet due to no available space, the PCIe I/F circuit 14 causes a packet not to be transmitted to the posted header buffer 201a, the posted data buffer 201b, and the non-posted header buffer 201c. For this flow control operation, the PCIe I/F circuit 201 transmits a packet called a data link layer packet (DLLP) to the PCIe I/F circuit 14 via the reception line 6b. The DLLP stores therein data such as an available space in each of the posted header buffer 201a, the posted data buffer 201b, and the non-posted header buffer 201c.

When the PCIe I/F circuit 14 is notified by the DLLP that each of the posted header buffer 201a, the posted data buffer 201b, and the non-posted header buffer 201c has no available space, it is impossible for the PCIe I/F circuit 14 to transmit a packet to the buffers 201a, 201b, and 201c.

Figure 3:
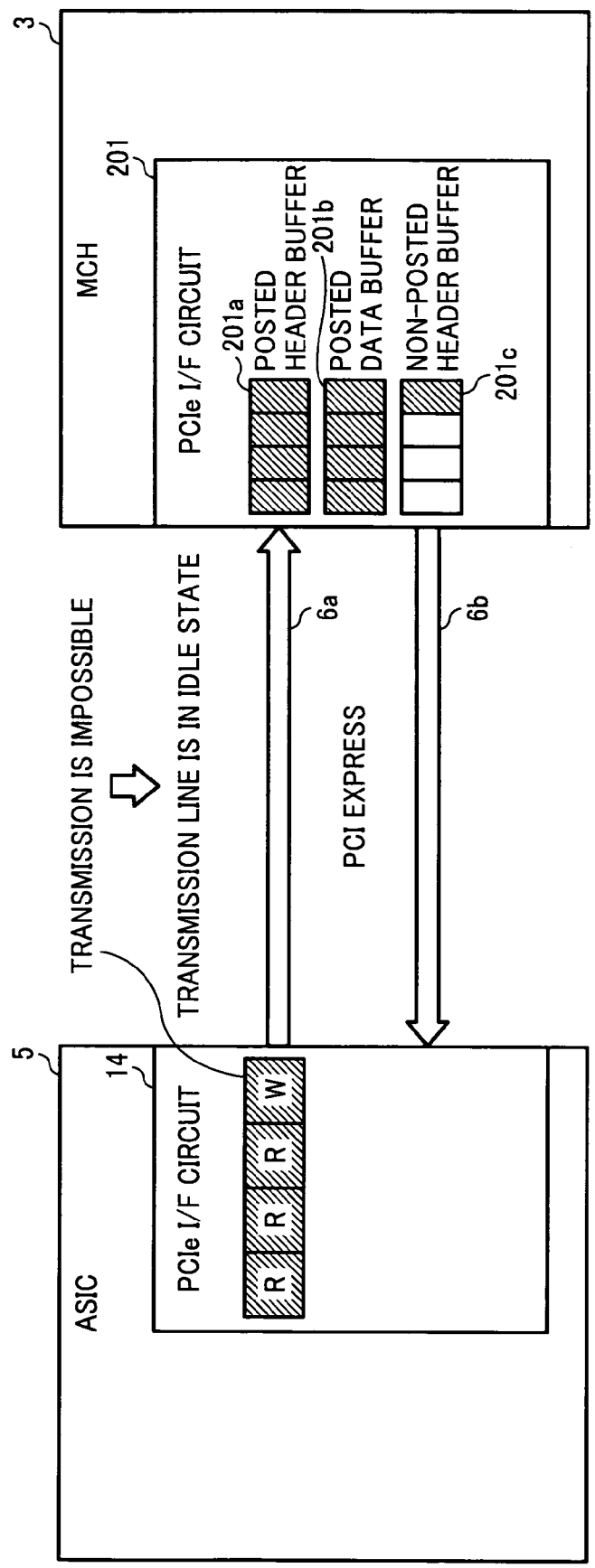
FIG. 3 is a schematic diagram for explaining a state that a posted header buffer in a PCIe I/F circuit shown in FIG. 2 has no available space.

FIG. 3 is a schematic diagram for explaining a state that the posted header buffer 201a has no available space. If the posted header buffer 201a has a small space and the PCIe I/F circuit 201 continuously receives packets from the PCIe I/F circuit 14, an available space in the posted header buffer 201a can be reduced to zero. In such a case, although the transmission line 6a is in an idle state, a write request cannot be transmitted to the posted header buffer 201a via the transmission line 6a, and therefore other subsequent request cannot be transmitted to the posted header buffer 201a.

Figure 4:
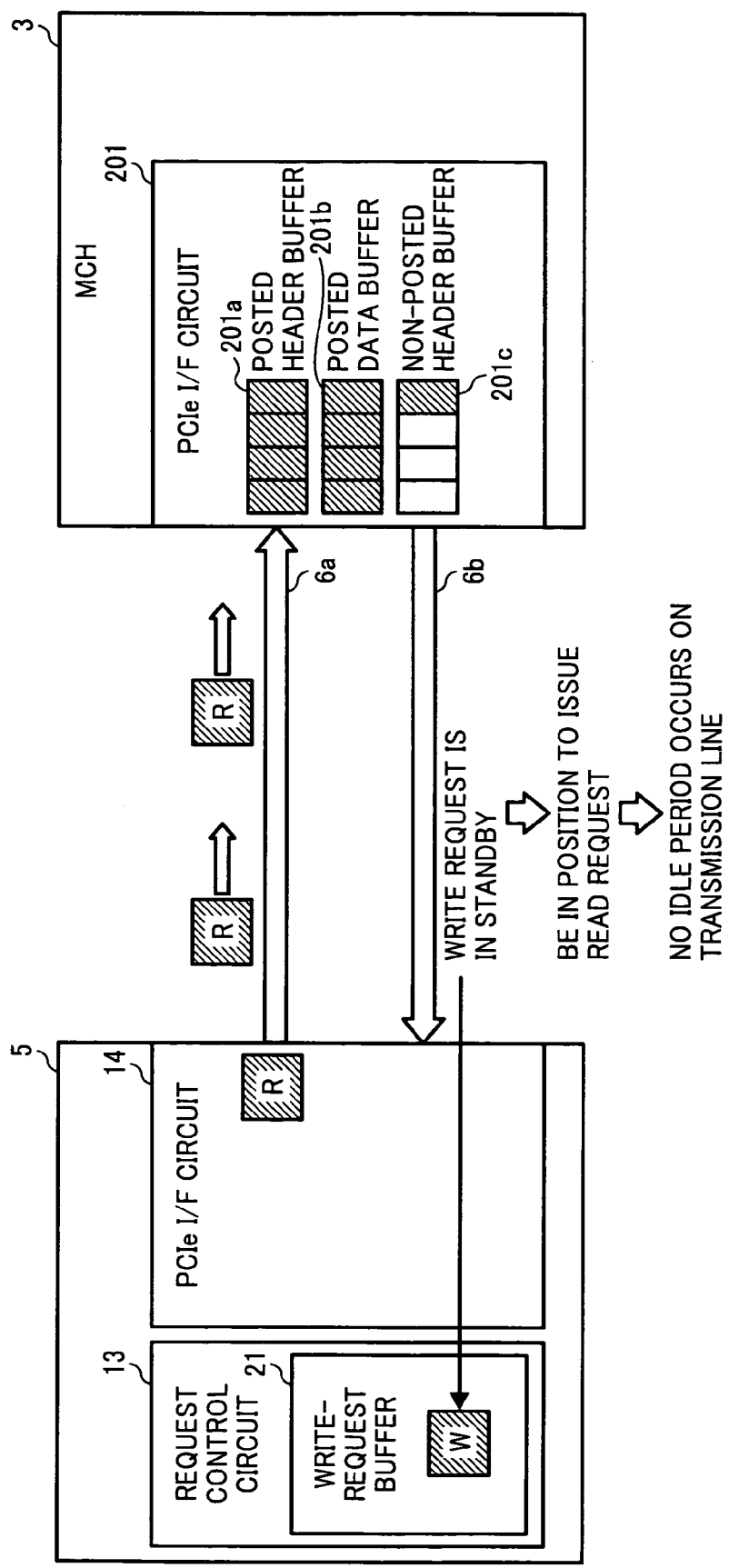
FIG. 4 is a schematic diagram for explaining operation performed by a control unit shown in FIG. 1 for transmitting a read request and a write request.

FIG. 4 is a schematic diagram for explaining operation performed by the control unit 23 for transmitting a read request and a write request. When the receiving unit 22 continuously receives write requests, the control unit 23 does not cause the receiving unit 22 to continuously transmit the received write requests to the PCIe I/F circuit 14. Instead, the control unit 23 causes a read request to overtake the write request as appropriate. In this manner, it is possible to shorten an idle period of the transmission line 6a, even if the posted header buffer 201a has a small space.

Generally, a space of a flow-control buffer is different in each PCIe I/F circuit. Furthermore, timing of transmitting a DLLP from a PCIe I/F circuit cannot be externally controlled. Specifically, a PCIe I/F circuit on the transmission side cannot determine a timing at which a space becomes available in a PCIe I/F circuit on the reception side only by using the DLLP. Therefore, it is preferable that the PCIe I/F circuit 14 controls transmission of a write request and a read request to the MCH 3 independent of a notification by the DLLP.

To control the transmission of a write request and a read request independent of the DLLP, the register 24 sets the allowable overtake number that is used to prevent the non-posted header buffer 201c from reducing its available space to zero by receiving read requests. Specifically, a read request is prevented from overtaking a write request based on the allowable overtake number, and a write request is transmitted to the PCIe I/F circuit 201 prior to the read request. Thus, it is possible to prevent an available space of the non-posted header buffer 201c from being reduced to zero.

In the same manner as the PCIe I/F circuit 201, the PCIe I/F circuit 14 includes a posted header buffer, a posted data buffer, and a non-posted header buffer. The posted header buffer, the posted data buffer, and the non-posted header buffer are flow-control buffers. An available space of each of the buffers 201a, 201b, and 201c in the PCIe I/F circuit 201 can be prevented from being reduced to zero by performing the above-described flow control operation. However, the flow control is not performed for each of the posted header buffer, the posted data buffer, and the non-posted header buffer in the PCIe I/F circuit 14. This is because, when the buffers in the PCIe I/F circuit 14 have available spaces, transmission of data, such as image data, has often been completed. Therefore, the flow control operation is not required for the buffers in the PCIe I/F circuit 14.

As shown in FIG. 1, the transmission I/F 14b receives a request from the request control circuit 13, and transmits the received request to the MCH 3 via the transmission line 6a. The reception I/F 14c receives data from the MCH 3 via the reception line 6b, and sends the received data to the request control circuit 13.

If the data transmission rate in the ASIC 5 is lower than the packet transmission speed of the PCIe 6, data received from the request control circuit 13 is temporarily stored in the data buffer 14a, so that it is possible to prevent data underflow.

As described above, in the image forming apparatus 1, when the request control circuit 13 continuously receives write requests, the request control circuit 13 performs a request control process, i.e., transmitting a read request to the PCIe I/F circuit 14 between the write requests. With this configuration, idle periods of the transmission line 6a and the reception line 6b can be reduced, the utilization efficiencies of the transmission line 6a and the reception line 6b can be increased, and the throughput of the whole system can be improved. Furthermore, the image forming apparatus 1 performs the request control process based on the allowable overtake number.

Figure 5:
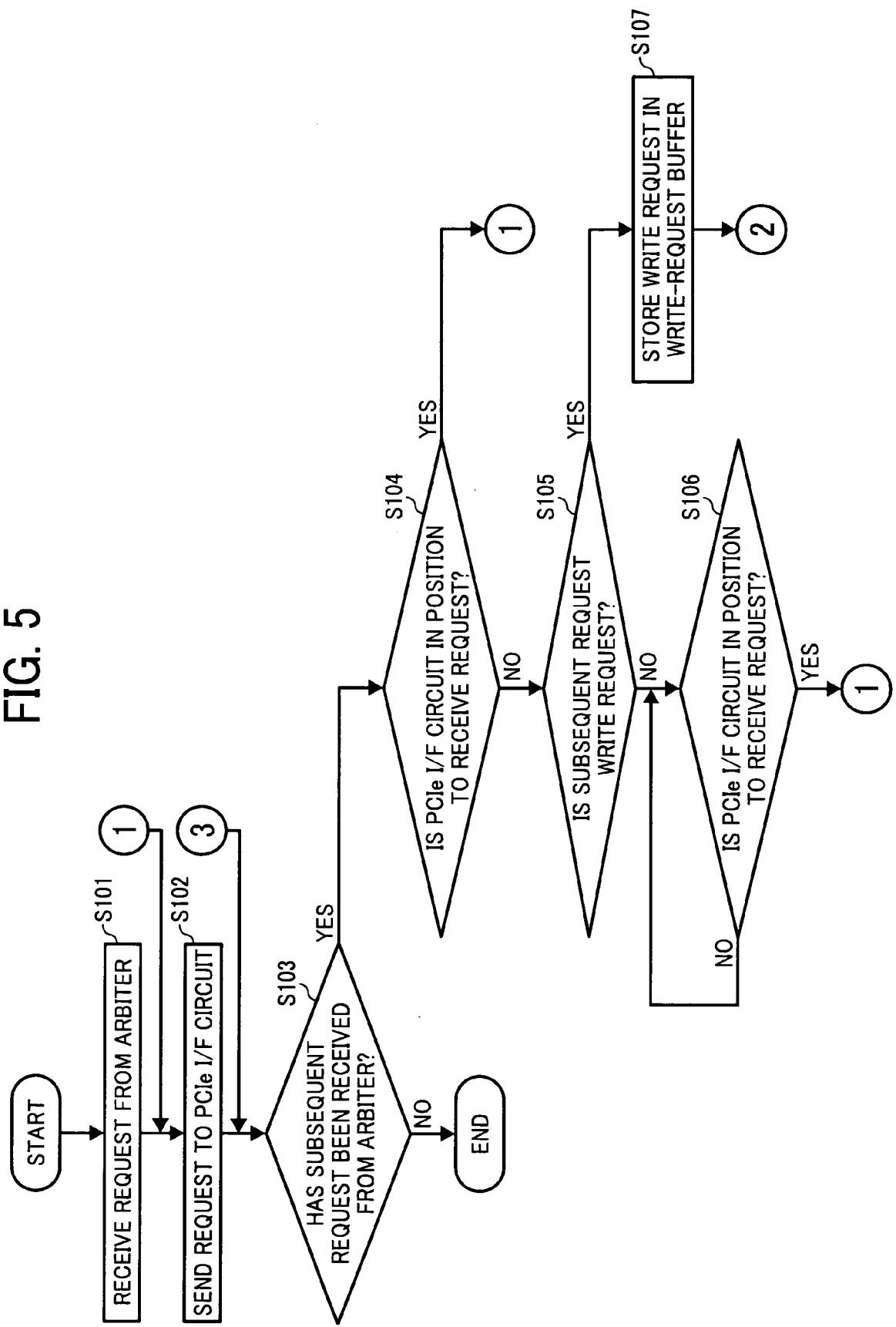
FIGS. 5 and 6 are flowcharts of a request control process performed by a request control circuit shown in FIG. 1.
Figure 6:
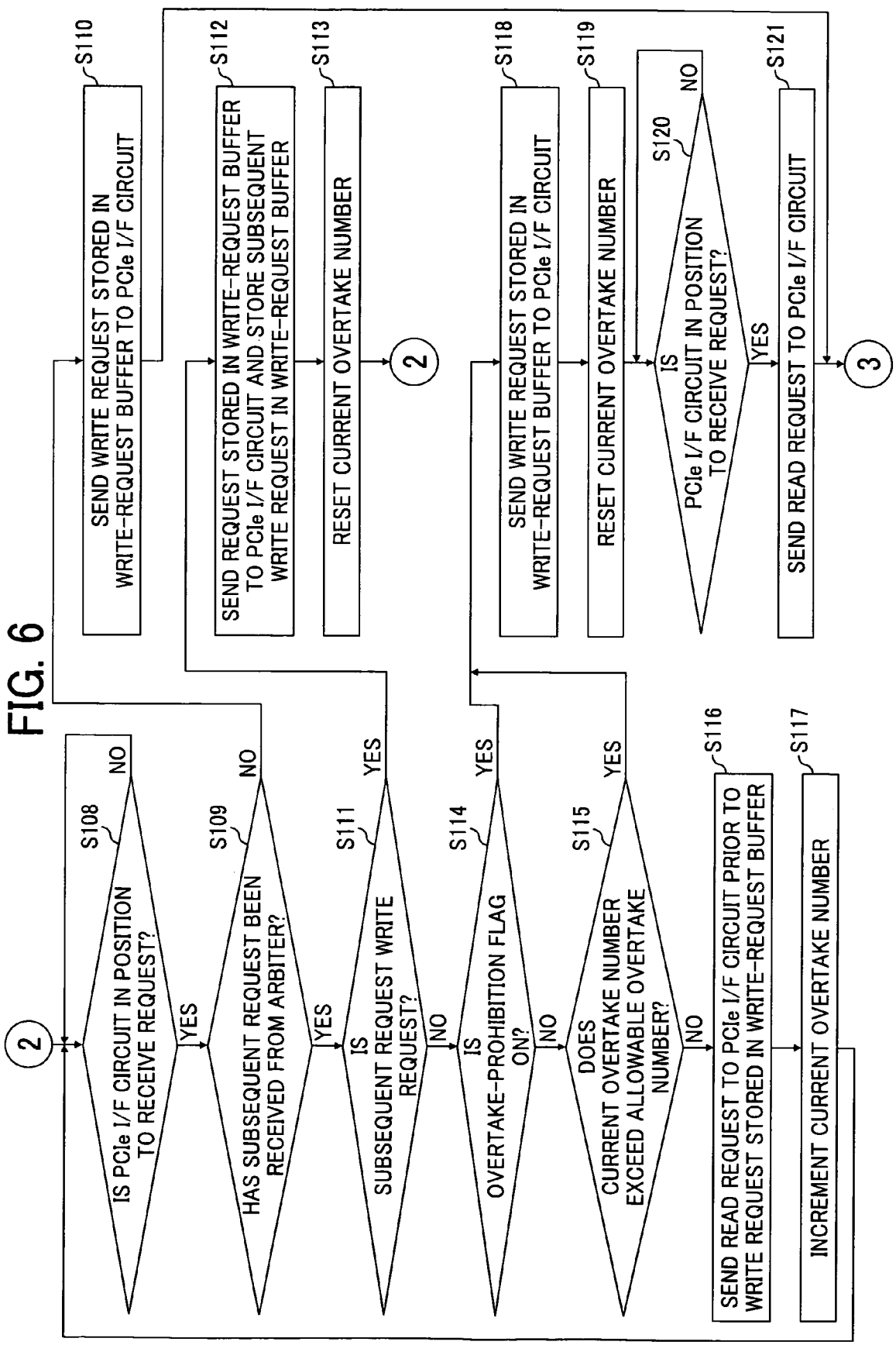

FIGS. 5 and 6 are flowcharts of the request control process performed by the request control circuit 13.

As shown in FIG. 5, the receiving unit 22 receives a first request from the arbiter 12 (step S101). The control unit 23 causes the received first request to be sent to the PCIe I/F circuit 14 (step S102), and checks whether a subsequent request is received from the arbiter 12 (step S103).

When the control unit 23 determines that a subsequent request is not received from the arbiter 12 (No at step S103), the process ends. On the other hand, when the control unit 23 determines that a subsequent request is received from the arbiter 12 (Yes at step S103), the control unit 23 checks whether the PCIe I/F circuit 14 is in a position to receive a request (step S104).

When the control unit 23 determines that the PCIe I/F circuit 14 is in a position to receive a request (Yes at step S104), the process control returns to step S102, and the processes from steps S102 to S104 are performed. On the other hand, when the control unit 23 determines that the PCIe I/F circuit 14 is not in a position to receive a request (No at step S104), the control unit 23 checks whether the subsequent request is a write request (step S105).

When the control unit 23 determines that the subsequent request is a read request (No at step S105), the control unit 23 checks whether the PCIe I/F circuit 14 is in a position to receive a request (step S106). When the control unit 23 determines that the PCIe I/F circuit 14 is in a position to receive a request (Yes at step S106), the process control returns to step S102, and the processes from steps S102 to S106 are repeated.

When the control unit 23 determines that the subsequent request is a write request (Yes at step S105), the control unit 23 causes the write request to be stored in the write-request buffer 21 (step S107). As shown in FIG. 6, the control unit 23 checks whether the PCIe I/F circuit 14 is in a position to receive a request (step S108).

When the control unit 23 determines that the PCIe I/F circuit 14 is in a position to receive a request (Yes at step S108), the control unit 23 checks whether the receiving unit 22 has received a subsequent request from the arbiter 12 (step S109). When the control unit 23 determines that the receiving unit 22 has not received a subsequent request from the arbiter 12 (No at step S109), the control unit 23 causes the write request stored in the write-request buffer 21 to be sent to the PCIe I/F circuit 14 (step S110). The process control returns to step S103 shown in FIG. 5, and the processes from steps S103 to S110 are repeated.

When the control unit 23 determines that the receiving unit 22 has received a subsequent request from the arbiter 12 (Yes at step S109), the control unit 23 checks whether the subsequent request is a write request (step S111). When the control unit 23 determines that the subsequent request is a write request (Yes at step S111), the control unit 23 causes the write request stored in the write-request buffer 21 to be sent to the PCIe I/F circuit 14, and causes the subsequent write request to be stored in the write-request buffer 21 (step S112). The counter 15 resets the current overtake number (step S113). The usage of the current number counted by the counter 15 is described later. The process control returns to step S108, and the processes from steps S108 to S112 are repeated.

When the control unit 23 determines that the subsequent request is a read request (No at step S111), the control unit 23 checks whether an overtake-prohibition flag of the write request stored in the write-request buffer 21 is ON (step S114). Specifically, the DMA 11 causes an overtake-prohibition flag of a write request to be on in the case that data can be inconsistent if a read request overtakes the write request. Moreover, the DMA 11 causes an overtake-prohibition flag of a specific write request to be ON. When it is required to set the overtake-prohibition flag of the write request ON (flag process), the CPU 2 sends a command to the DMA 11 in accordance with software.

When the control unit 23 determines that the overtake-prohibition flag of the write request is not ON (No at step S114), the control unit 23 checks whether the current number counted by the counter 15 exceeds the allowable overtake number set by the register 24 (step S115). When the control unit 23 determines that the current overtake number does not exceed the allowable overtake number (No at step S115), the control unit 23 determines that the number of read requests that have overtaken the write request does not exceed the allowable overtake number. Therefore, the control unit 23 causes the subsequent read request to overtake the write request stored in the write-request buffer 21, so that the subsequent read request is sent to the PCIe I/F circuit 14 prior to the write request (step S116).

When the control unit 23 causes the read request to overtake the write request and be sent to the PCIe I/F circuit 14 prior to the write request, the control unit 23 causes the counter 15 to increment the current overtake number (step S117). The process control then returns to step S108.

When the control unit 23 determines that the current overtake number exceeds the allowable overtake number (Yes at step S115), the control unit 23 determines that the number of read requests that have overtaken the write request exceeds the allowable overtake number. Therefore, the control unit 23 causes the write request stored in the write-request buffer 21 to be sent to the PCIe I/F circuit 14 (step S118). The counter 15 then resets the current overtake number (step S119). The control unit 23 determines whether the PCIe I/F circuit 14 is in a position to receive a request (step S120). When the control unit 23 determines that the PCIe I/F circuit 14 is in a position to receive a request (Yes at step S120), the control unit 23 causes the subsequent read request to be sent to the PCIe I/F circuit 14 (step S121). The process control then returns to step S103.

When the control unit 23 determines that the overtake-prohibition flag of the write request stored in the write-request buffer 21 is ON (Yes at step S114), the control unit 23 causes the write request to be sent to the PCIe I/F circuit 14 (step S118). The counter 15 then resets the current overtake number (step S119). The control unit 23 determines whether the PCIe I/F circuit 14 is in a position to receive a request (step S120). When the control unit 23 determines that the PCIe I/F circuit 14 is in a position to receive a request (Yes at step S120), the control unit 23 causes the subsequent read request to be sent to the PCIe I/F circuit 14 (step S121). The process control then returns to step S103.

As described above, the ASIC 5 is configured in such a manner that, when the receiving unit 22 receives a subsequent write request while the transmission I/F 14b is in process of transmitting a write request to the memory 4, the control unit 23 causes the subsequent write request to be stored in the write-request buffer 21. When the receiving unit 22 receives a subsequent read request while the write request is stored in the write-request buffer 21, the control unit 23 causes the subsequent read request to overtake the write request stored in the write-request buffer 21 and be sent to the PCIe I/F circuit 14 prior to the write request.

Figure 10:
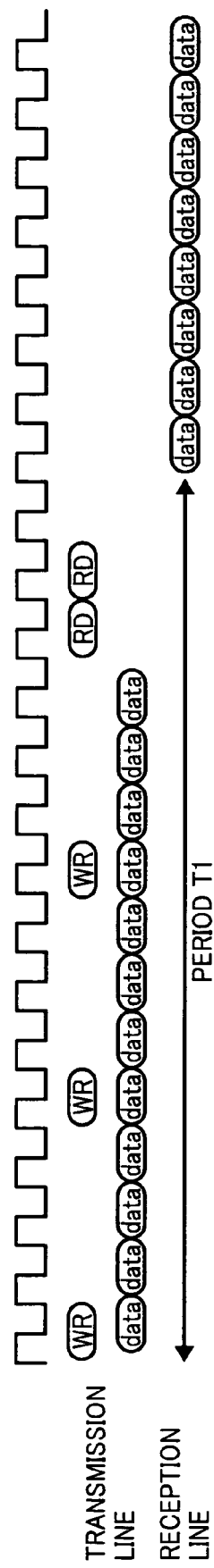
FIG. 10 is a schematic diagram for explaining transmission efficiency of a conventional PCIe.
Figure 11:
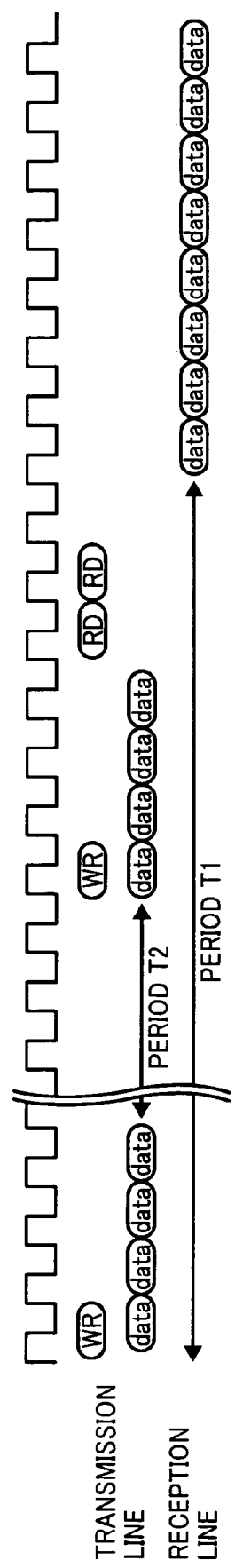
FIG. 11 is a schematic diagram for explaining another example of transmission efficiency of a conventional PCIe.

As shown in FIG. 7, a read request containing no data can be sent to the PCIe I/F circuit 14 between write requests each containing data to be written. Thus, compared with the conventional technologies shown in FIGS. 10 and 11, it is possible to reduce idle periods of the transmission line 6a and the reception line 6b. Therefore, the utilization efficiencies of the transmission line 6a and the reception line 6b can be improved, and the throughput of the whole image forming apparatus 1 can be improved.

Specifically, because the write request is sent with data to be written via the transmission line 6a, occupancy of the transmission line 6a by the write request is high. On the other hand, because the read request is sent with only a command (a header of a packet), i.e., without data to be written, via the transmission line 6a, the occupancy of the transmission line 6a by the read request is low.

For this reason, even if a read request overtakes a write request, little effect is exerted on transmission capacity of the transmission line 6a.

Therefore, the image forming apparatus 1 performs processes according to the above-described procedures. Specifically, the arbiter 12 processes usually process a write request prior to a read request. However, when the transmission line 6a is busy with write requests and data to be written, a read request is sent to the PCIe I/F circuit 14 between write requests. Thus, it is possible to reduce an idle period of the reception line 6b without affecting the transmission capacity of the transmission line 6a. Furthermore, the utilization efficiencies of the transmission lines (bi-directionally) can be increased, and the throughput of the whole image forming apparatus 1 can be improved.

Moreover, in the ASIC 5, the control unit 23 allows a read request to overtake a write request until the current number counted by the counter 15 exceeds the allowable overtake number set by the register 24. When the current number counted by the counter 15 exceeds the allowable overtake number, the control unit 23 inhibits overtaking of a write request stored in the write-request buffer 21 by a subsequent read request, and sends the write request to the PCIe I/F circuit 14 prior to the subsequent read request.

As described above, the transmissions of a write request and a read request are controlled based on the allowable overtake number. Thus, it is possible to balance the amount of data in the transmission line 6a and the reception line 6b, and the utilization efficiencies of the transmission line 6a and the reception line 6b can be further improved.

Furthermore, in the ASIC 5, when the overtake-prohibition flag of a write request is ON, the request control circuit 13 inhibits overtaking of the write request by a subsequent read request.

Inhibiting the overtaking is required when a user enters a command to perform rotation processing on image data acquired by a scanner, and print out the resultant image data. To print out image data without performing other process after the image data is acquired by a scanner of the image forming apparatus 1, a process of reading the image data from the memory 4 can be performed by sequentially reading data written in a data area of the memory 4, even before a process of writing the image data in the memory 4 is not completed. However, if rotation processing is performed on image data, a reading process is often performed by reading the latest data written in the memory 4. In such a case, if a read request overtakes a write request, the image data can be inconsistent.

Therefore, the overtake-prohibition flag is ON in a write request issued from the DMA 11 or a specific write request if data can be inconsistent when a read-request overtakes such a write request. Thus, the utilization efficiencies of the transmission line 6a and the reception line 6b can be improved, and the throughput of the whole image forming apparatus 1 can be increased. Furthermore, the consistency of data can be achieved, and a request can be issued appropriately.

The CPU 2 activates the DMA 11 depending on a function to be executed. Upon activating the DMA 11, the CPU 2 determines whether a write request issued from the DMA 11 needs to be inhibited from the overtaking depending on an operation mode of the DMA 11. A setting of the inhibition is stored as a flag in the DMA 11. Then, the DMA 11 refers to the flag, and causes an overtake-prohibition flag of a write request to be ON.

When the request control circuit 13 receives a write request with the overtake-prohibition flag ON, the request control circuit 13 first sends the write request to the PCIe I/F circuit 14 regardless of states of the transmission line 6a and the reception line 6b. In this manner, the transmission I/F 14b can cause a read request not to overtake a write request with the overtake-prohibition flag ON. Thus, it is possible to prevent inconsistency of data, and use the transmission lines in an effective manner.

Moreover, the ASIC 5 can be configured in such a manner that, when a write request with the overtake-prohibition flag ON is received from the DMA 11 via the arbiter 12, the control unit 23 does not cause the received write request to be stored in the write-request buffer 21, and causes the write request to be sent to the PCIe I/F circuit 14 after a foregoing write request is processed.

In this manner, it is possible to reduce time for writing and reading a write request that can be redundant because of data accompanied with the write request, and to improve the throughput of the whole image forming apparatus 1.

Figure 8:
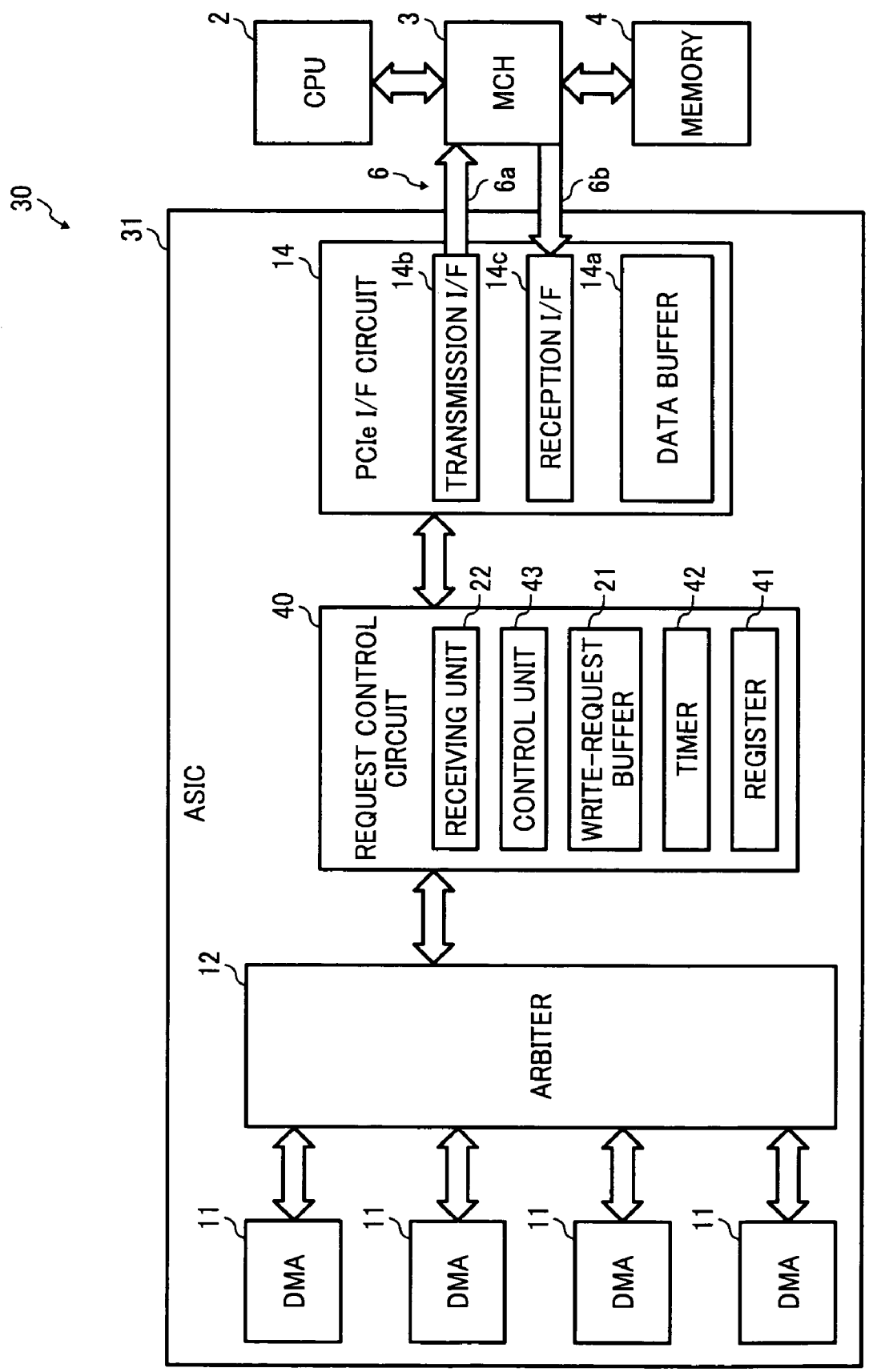
FIG. 8 is a block diagram of a relevant part of an image forming apparatus according to a second embodiment of the present invention.

FIG. 8 is a block diagram of a relevant part of an image forming apparatus 30 according to a second embodiment of the present invention.

The image forming apparatus 30 is configured in a similar manner to the image forming apparatus 1 of the first embodiment. In the second embodiment, the same reference numerals are used for components that are the same as those in the first embodiment, and detailed descriptions of such components are omitted.

In the same manner as the image forming apparatus 1, the image forming apparatus 30 includes the CPU 2, the MCH 3, and the memory 4. The image forming apparatus 30 includes an ASIC 31 that is a semiconductor integrated circuit. The ASIC 31 is connected to the MCH 3 via the PCIe 6.

In the same manner as the ASIC 5, the ASIC 31 includes the DMAs 11, the arbiter 12, and the PCIe I/F circuit 14. The ASIC 31 includes a request control circuit 40.

In the same manner as the request control circuit 13, the request control circuit 40 includes the write-request buffer 21. The request control circuit 40 includes a control unit 43, a register 41, and a timer 42. The control unit 43 performs processes in a different manner from that of the control unit 23.

The register 41 (an allowable overtake—period setting unit) sets an allowable overtake-period, during which the CPU 2 allows a subsequent read request to overtake a write request stored in the write-request buffer 21. The timer 42 starts when the request control circuit 40 receives a write request from the arbiter 12 and causes the received write request to be stored in the write-request buffer 21.

The control unit 43 controls a subsequent read request to overtake a write request stored in the write-request buffer 21 based on the allowable overtake-period set by the register 41 and the time measured by the timer 42.

Specifically, when the receiving unit 22 receives a write request from the arbiter 12 and stores the received write request in the write-request buffer 21, the timer 42 starts. When the receiving unit 22 receives a read request before the counted time reaches the allowable overtake-period set by the register 41, the control unit 43 causes the read request to overtake a write request stored in the write-request buffer 21, and sends the read request to the PCIe I/F circuit 14 prior to the write request. On the other hand, when the receiving unit 22 receives a read request after the counted time reaches the allowable overtake-period, the control unit 43 inhibits the read request to overtake the write request stored in the write-request buffer 21. The control unit 43 then sends the write request stored in the write-request buffer 21 to the PCIe I/F circuit 14 when the PCIe I/F circuit 14 is in a position to receive a request.

When the receiving unit 22 receives a subsequent write request from the DMA 11 before the counted time reaches the allowable overtake-period while a write request is stored in the write-request buffer 21, the control unit 43 stands by until the PCIe I/F circuit 14 is in a position to receive a request, and causes the write request stored in the write-request buffer 21 to be sent to the PCIe I/F circuit 14 when the PCIe I/F circuit 14 is in the position to receive a request. The control unit 23 then causes the subsequent write request to be stored in the write-request buffer 21. The timer 42 resets and then starts again.

As described above, in the ASIC 31, the control unit 43 allows a read request to overtake a write request stored in the write-request buffer 21 only during the allowable overtake-period set by the register 41.

In the image forming apparatus 30, when the amount of data to be written is large, the data is caused to be in a standby state in the write-request buffer 21, and it is checked whether to receive a read request. When a read request is received, the read request is sent to the PCIe I/F circuit 14 prior to the data. Therefore, the PCIe 6 can be used in an effective manner, and the throughput of the image forming apparatus 30 can be further improved.

Figure 9:
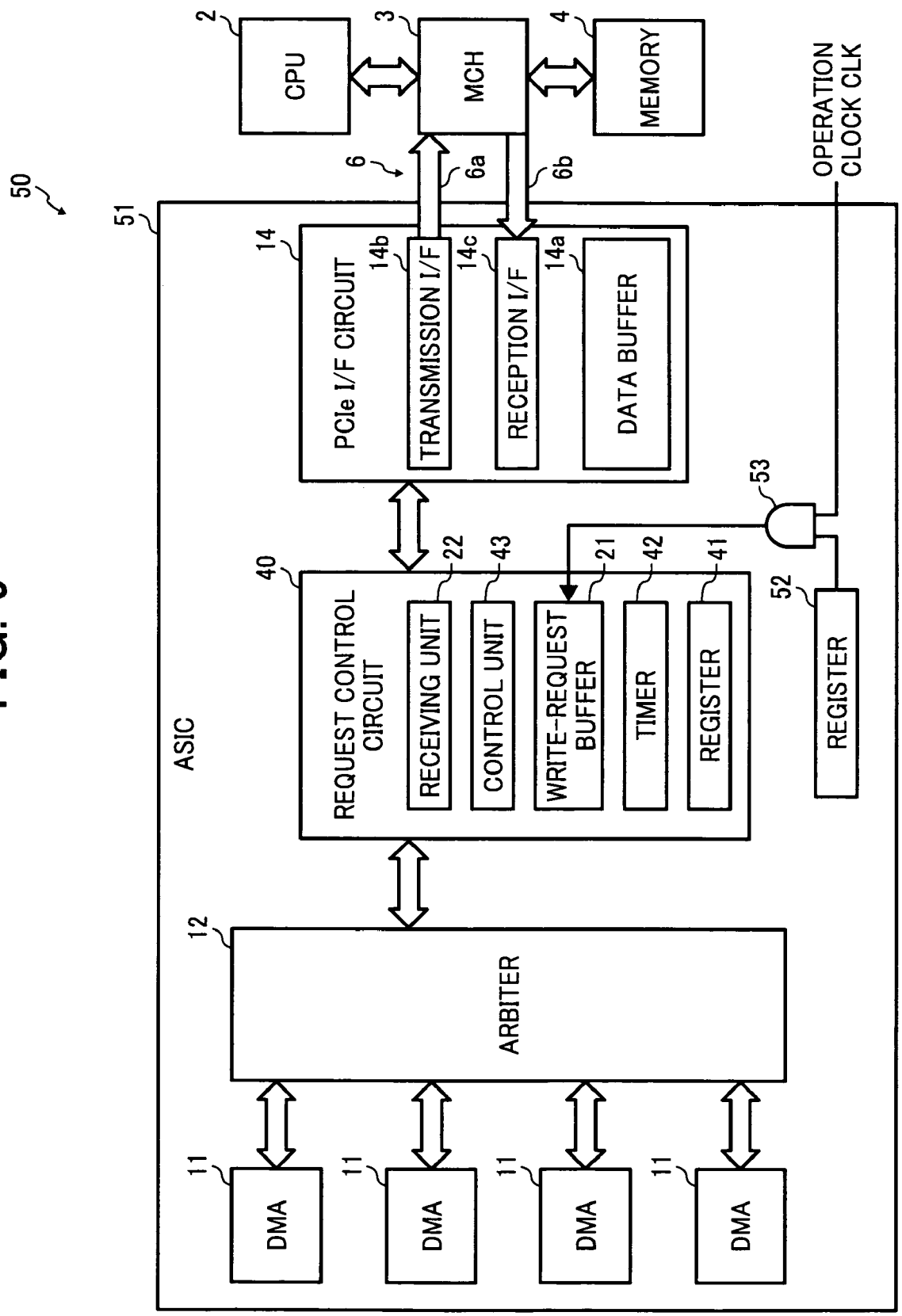
FIG. 9 is a block diagram of a relevant part of an image forming apparatus according to a third embodiment of the present invention.

FIG. 9 is a block diagram of a relevant part of an image forming apparatus 50 according to a third embodiment of the present invention.

The image forming apparatus 50 is configured in a similar manner to the image forming apparatus 1 of the first embodiment. In the third embodiment, the same reference numerals are used for components that are the same as those in the first embodiment, and detailed descriptions of such components are omitted.

In the same manner as the image forming apparatus 1, the image forming apparatus 50 includes the CPU 2, the MCH 3, and the memory 4. The image forming apparatus 50 includes an ASIC 51 that is a semiconductor integrated circuit. The ASIC 51 is connected to the MCH 3 via the PCIe 6.

In the same manner as the ASIC 5, the ASIC 51 includes the DMAs 11, the arbiter 12, and the PCIe I/F circuit 14. The ASIC 51 includes the request control circuit 40 that is the same as that in the second embodiment.

The request control circuit 40 includes the control unit 43, the register 41, and the timer 42 that are the same as those in the second embodiment.

The ASIC 51 includes a register 52 and an AND circuit 53. The AND circuit 53 receives an output from an operation clock CLK that is arranged for the write-request buffer 21 and an output from the register 52. An output of the AND circuit 53 is fed to an input terminal of the operation clock CLK.

The register 52 selectively sets a value "1" or "0" that is determined by the CPU 2, and feeds the set value to the AND circuit 53.

When the register 52 sets the value "1", the AND circuit 53 causes an output of the operation clock CLK to be fed to the write-request buffer 21. When the register 52 sets the value "0", the AND circuit 53 does not cause an output of the operation clock CLK to be fed to the write-request buffer 21, thereby suspending operation of the write-request buffer 21.

Thus, a write request is prevented from being written to or read from the write-request buffer 21.

Therefore, the register 52 and the AND circuit 53 function as a request-buffer-operation control unit. Specifically, the register 52 and the AND circuit 53 cause an output of the operation clock CLK not to be fed to the write-request buffer 21, prevent a write request from being stored in the write-request buffer 21, and inhibits overtaking of a proceeding write request by a subsequent read request. Although the register 52 and the AND circuit 53 are arranged outside the request control circuit 40, the register 52 and the AND circuit 53 can be arranged inside the request control circuit 40.

In the ASIC 51, when the overtaking operation is effective, i.e., when a write request is stored in the write-request buffer 21 and a subsequent read request overtakes the write request stored in the write-request buffer 21, the register 52 sets the value "0" and an output of the operation clock CLK is fed to the write-request buffer 21 via the AND circuit 53. When the overtaking process is not effective, the register 52 sets the value "1" and an output of the operation clock CLK is prevented from being fed to the write-request buffer 21 via the AND circuit 53.

Thus, it is possible to omit operation of causing overtake-prohibition flags of the DMAs 11 to be ON by using software, and hinder overtaking of a proceeding write request by a subsequent read in an easy manner by preventing an output of the operation clock CLK from being fed to the write-request buffer 21. Furthermore, it is possible to reduce power consumption by preventing an output of the operation clock CLK from being fed to the write-request buffer 21 and suspending operation of the write-request buffer 21.

According to an aspect of the present invention, when a subsequent read command to read data from a memory is received while a write command to write data in the memory is stored in a buffer, the subsequent read command is sent to a transmission interface prior to the write command. In this manner, a read command containing no data to be written is sent to the transmission interface prior to a write command containing data to be written. Thus, it is possible to reduce idle periods of a transmission line and a reception line, increase the utilization efficiencies of the transmission line and the reception line, and improve the throughput of the whole system.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A semiconductor integrated circuit that is configured to be connected to a memory via a transmission line and a reception line that support a split transaction, the semiconductor integrated circuit comprising:
a receiving unit that receives a write command to write data in the memory, write data to be written in the memory, and a read command to read data from the memory;
a transmission interface that receives the write command, the write data, and the read command from the receiving unit, and sends the write command, the write data, and the read command to the transmission line;
a reception interface that receives read data that is read from the memory via the reception line, and sends the read data to the receiving unit;
a buffer that is configured to temporarily store therein at least one write command that is received by the receiving unit;
a control unit that when the receiving unit receives a second write command while the transmission interface is in process of transmitting to the transmission line at least one of a first write command and write data corresponding to the first write command, causes the receiving unit to store the second write command in the buffer, and when the receiving unit receives a read command while the second write command is present in the buffer, causes the receiving unit to send the read command to the transmission interface prior to the second write command present in the buffer to the transmission interface;
a counting unit that counts current number of subsequent read commands that overtake the second write command while the second write command is present in the buffer; and
an allowable-number setting unit that sets an allowable number of subsequent read commands that are to overtake a proceeding write command while the proceeding write command is present in the buffer, wherein when the current number counted by the counting unit exceeds the allowable number, the control unit inhibits overtaking of the second write command by a subsequent read command and causes the receiving unit to send the second write command to the transmission interface.

2. The semiconductor integrated circuit according to claim 1, wherein a write command that is received by the receiving unit is configured to include a prohibition flag, and when the receiving unit receives a write command with the prohibition flag, the control unit inhibits overtaking of the write command by a subsequent read command.

3. A semiconductor integrated circuit that is configured to be connected to a memory via a transmission line and a reception line that support a split transaction, the semiconductor integrated circuit comprising:
a receiving unit that receives a write command to write data in the memory, write data to be written in the memory, and a read command to read data from the memory;
a transmission interface that receives the write command, the write data, and the read command from the receiving unit, and sends the write command, the write data, and the read command to the transmission line;
a reception interface that receives read data that is read from the memory via the reception line, and sends the read data to the receiving unit;
a buffer that is configured to temporarily store therein at least one write command that is received by the receiving unit;
a control unit that when the receiving unit receives a second write command while the transmission interface is in process of transmitting to the transmission line at least one of a first write command and write data corresponding to the first write command, causes the receiving unit to store the second write command in the buffer, and when the receiving unit receives a read command while the second write command is present in the buffer, causes the receiving unit to send the read command to the transmission interface prior to the second write command present in the buffer to the transmission interface,
wherein a write command that is received by the receiving unit is configured to include a prohibition flag, and when the receiving unit receives a write command with the prohibition flag, the control unit inhibits overtaking of the write command by a subsequent read command, and
wherein when the second write command received by the receiving unit is a write command with the prohibition flag, the control unit causes the receiving unit to send the second write command to the transmission interface without temporarily storing the second write command in the buffer after the transmission interface has transmitted to the transmission line both the first write command and the write data corresponding to the first write command.

4. The semiconductor integrated circuit according to claim 2, wherein when the second write command received by the receiving unit is a write command with the prohibition flag, the control unit causes the receiving unit to send the second write command to the transmission interface without temporarily storing the second write command in the buffer after the transmission interface has transmitted to the transmission line both the first write command and the write data corresponding to the first write command.

5. A semiconductor integrated circuit that is configured to be connected to a memory via a transmission tine and a reception line that support a split transaction, the semiconductor integrated circuit comprising:
a receiving unit that receives a write command to write data in the memory, write data to be written in the memory, and a read command to read data from the memory;
a transmission interface that receives the write command, the write data, and the read command from the receiving unit, and sends the write command, the write data, and the read command to the transmission line;
a reception interface that receives read data that is read from the memory via the reception line, and sends the read data to the receiving unit;
a buffer that is configured to temporarily store therein at least one write command that is received by the receiving unit;
a control unit that when the receiving unit receives a second write command while the transmission interface is in process of transmitting to the transmission line at least one of a first write command and write data corresponding to the first write command, causes the receiving unit to store the second write command in the buffer, and when the receiving unit receives a read command while the second write command is present in the buffer, causes the receiving unit to send the read command to the transmission interface prior to the second write command present in the buffer to the transmission interface; and
a buffer-operation control unit that starts or stops supplying an operation clock to the buffer, wherein the control unit causes the buffer-operation control unit to stop supplying the operation clock to the buffer thereby preventing a write command received by the receiving unit from being stored in the buffer whereby inhibiting overtaking of the write command by a subsequent read command.

6. The semiconductor integrated circuit according to claim 1, further comprising
a buffer-operation control unit that starts or stops supplying an operation clock to the buffer, wherein the control unit causes the buffer-operation control unit to stop supplying the operation clock to the buffer thereby preventing a write command received by the receiving unit from being stored in the buffer whereby inhibiting overtaking of the write command by a subsequent read command.

7. The semiconductor integrated circuit according to claim 1, further comprising
an allowable-period setting unit that sets an allowable period, wherein when the receiving unit receives a read command during the allowable period while the second write command is present in the buffer, the control unit causes the receiving unit to send the read command to the transmission interface prior to the second write command to the transmission interface.

8. The semiconductor integrated circuit according to claim 3, further comprising
an allowable-period setting unit that sets an allowable period, wherein when the receiving unit receives a read command during the allowable period while the second write command is present in the buffer, the control unit causes the receiving unit to send the read command to the transmission interface prior to the second write command to the transmission interface.

9. The semiconductor integrated circuit according to claim 2, further comprising
an allowable-period setting unit that sets an allowable period, wherein when the receiving unit receives a read command during the allowable period while the second write command is present in the buffer, the control unit causes the receiving unit to send the read command to the transmission interface prior to the second write command to the transmission interface.

10. The semiconductor integrated circuit according to claim 3, further comprising
an allowable-period setting unit that sets an allowable period, wherein when the receiving unit receives a read command during the allowable period while the second write command is present in the buffer, the control unit causes the receiving unit to send the read command to the transmission interface prior to the second write command to the transmission interface.

11. The semiconductor integrated circuit according to claim 4, further comprising
an allowable-period setting unit that sets an allowable period, wherein when the receiving unit receives a read command during the allowable period while the second write command is present in the buffer, the control unit causes the receiving unit to send the read command to the transmission interface prior to the second write command to the transmission interface.

12. The semiconductor integrated circuit according to claim 5, further comprising
an allowable-period setting unit that sets an allowable period, wherein when the receiving unit receives a read command during the allowable period while the second write command is present in the buffer, the control unit causes the receiving unit to send the read command to the transmission interface prior to the second write command to the transmission interface.

13. The semiconductor integrated circuit according to claim 6, further comprising
an allowable-period setting unit that sets an allowable period, wherein when the receiving unit receives a read command during the allowable period while the second write command is present in the buffer, the control unit causes the receiving unit to send the read command to the transmission interface prior to the second write command to the transmission interface.

14. An image processing apparatus comprising:
a memory that is configured to store therein image data; and
a semiconductor integrated circuit that is configured to be connected to the memory via a transmission line and a reception line that support a split transaction, the semiconductor integrated circuit including a receiving unit that receives a write command to write data in the memory, write data to be written in the memory, and a read command to read data from the memory;

a transmission interface that receives the write command, the write data, and the read command from the receiving unit, and sends the write command, the write data, and the read command to the transmission line;

a reception interface that receives read data that is read from the memory via the reception line, and sends the read data to the receiving unit;

a buffer that is configured to temporarily store therein at least one write command that is received by the receiving unit; and a control unit that when the receiving unit receives a second write command while the transmission interface is in process of transmitting to the transmission line at least one of a first write command and write data corresponding to the first write command, causes the receiving unit to store the second write command in the buffer, and when the receiving unit receives a read command while the second write command is present in the buffer, causes the receiving unit to send the read command to the transmission interface prior to the second write command present in the buffer to the transmission-interfaces, wherein the semiconductor integrated circuit further includes a counting unit that counts current number of subsequent read commands that overtake the second write command while the second write command is present in the buffer; and an allowable-number setting unit that sets an allowable number of subsequent read commands that are to overtake a proceeding write command while the proceeding write command is present in the buffer, wherein when the current number counted by the counting unit exceeds the allowable number, the control unit inhibits overtaking of the second write command by a subsequent read command and causes the receiving unit to send the second write command to the transmission interface.

15. The image processing apparatus according to claim 14, wherein a write command that is received by the receiving unit is configured to include a prohibition flag, and when the receiving unit receives a write command with the prohibition flag, the control unit inhibits overtaking of the write command by a subsequent read command.

* * * * *